(12) United States Patent
Shih et al.

(10) Patent No.: US 6,369,377 B1
(45) Date of Patent: Apr. 9, 2002

(54) MULTIPLE-BEAM HOLOGRAPHIC OPTICAL PICK-UP HEAD

(75) Inventors: Hsi-Fu Shih, Chang-Hua Hsien; Jau-Jiu Ju, Chutung Hsinchu; Tzu-Ping Yang, Taipei; Wei-Chih Lu, Tainan, all of (TW); Mark O. Freeman, San Mateo, CA (US); Der-Ray Huang, Hsinchu; Carl Y. Yang, Chutung Hsinchu, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/615,412

(22) Filed: Jul. 13, 2000

(30) Foreign Application Priority Data

May 8, 2000 (TW) .......................................... 89108737

(51) Int. Cl.$^7$ ................................................. G11B 7/00
(52) U.S. Cl. ............... 250/225; 250/201.5; 369/112.04; 369/112.05; 369/112.1; 369/112.15; 369/112.16; 369/112.12
(58) Field of Search .............................. 250/201.5, 225, 250/237 G; 369/112.04, 112.05, 112.1, 112.15, 112.16, 112.12

(56) References Cited

U.S. PATENT DOCUMENTS 5,739,952 A * 4/1998 Takeda et al. ............... 359/495
5,828,643 A * 10/1998 Takeda et al. ............... 369/103
6,016,300 A * 1/2000 Takeda et al. ............... 369/103
6,118,586 A * 9/2000 Tanabe et al. ............... 359/566
6,201,228 B1 * 3/2001 Yoshida .................... 250/201.5
6,271,966 B1 * 8/2001 Tanabe et al. ............... 359/566

OTHER PUBLICATIONS

Lee, "High efficiency multiple beam gratings", Applied Optics 18, 2152 (1979).*
Lee, "Binary Synthetic Holograms", Applied Optics 13, 1677 (1974).*

* cited by examiner

Primary Examiner—Robert H. Kim
Assistant Examiner—Allen C. Ho
(74) Attorney, Agent, or Firm—W. Wayne Liauh (57) ABSTRACT

The present invention discloses a multiple-beam holographic optical pick-up head, which has the advantages of the multiple-beam optical pick-up head and the holographic optical pick-up head and can increase the light usage efficiency. This invention uses the property that a polarized diffractive optical element can generate different optical effects for laser beam with different polarizations and places a polarized multiple-beam grating and polarized hologram on the optical path for splitting the incident light toward the disc into multiple reading beams by the multiple-beam grating. The returning laser beams reflected from the disc are diffracted and diverted by the hologram to reach a photodetector. Both the incident and reflective beams are diffracted once only; thus the light usage efficiency can be increased.

20 Claims, 7 Drawing Sheets

MULTIPLE-BEAM HOLOGRAPHIC OPTICAL PICK-UP HEAD

BACKGROUND OF THE INVENTION

1. Field of Invention

The present invention in general relates to a multiple-beam holographic optical pick-up head. More particularly, this invention combines the advantages of the multiple-beam optical pick-up head and the holographic optical pick-up head and can be the data retrieval pick-up head for the optical recording media.

2. Related Art

The data reading and writing on optical recording media such as the CD, CD-R and DVD are done with the help of an optical pick-up head. When writing, the laser beam converges on the data storage surface of the optical disk and changes its physical property; while when reading, the laser beam first converges on the data storage surface of the disk, then gets reflected and absorbed by a photodetector. This beam containing data signals is therein converted into the corresponding electrical signals.

Conventional optical disk drives use only a single beam to access data on the disk. Their speeds in reading/writing can only be increased by increasing the rotational speed of the motor, which is the way most high-speed optical disk drives adopt. However, the motor rotational speed has its own limit, this method is thus imperfect.

Multiple-beam reading/writing uses a special grating to split a laser beam into a plurality of separate laser beams that simultaneously accessing data in different tracks of the optical disk. With special control and a decoding circuit, data in different tracks are then recombined together. Therefore, this method can greatly increase the reading/writing speed of an optical disk drive.

Figure 1:
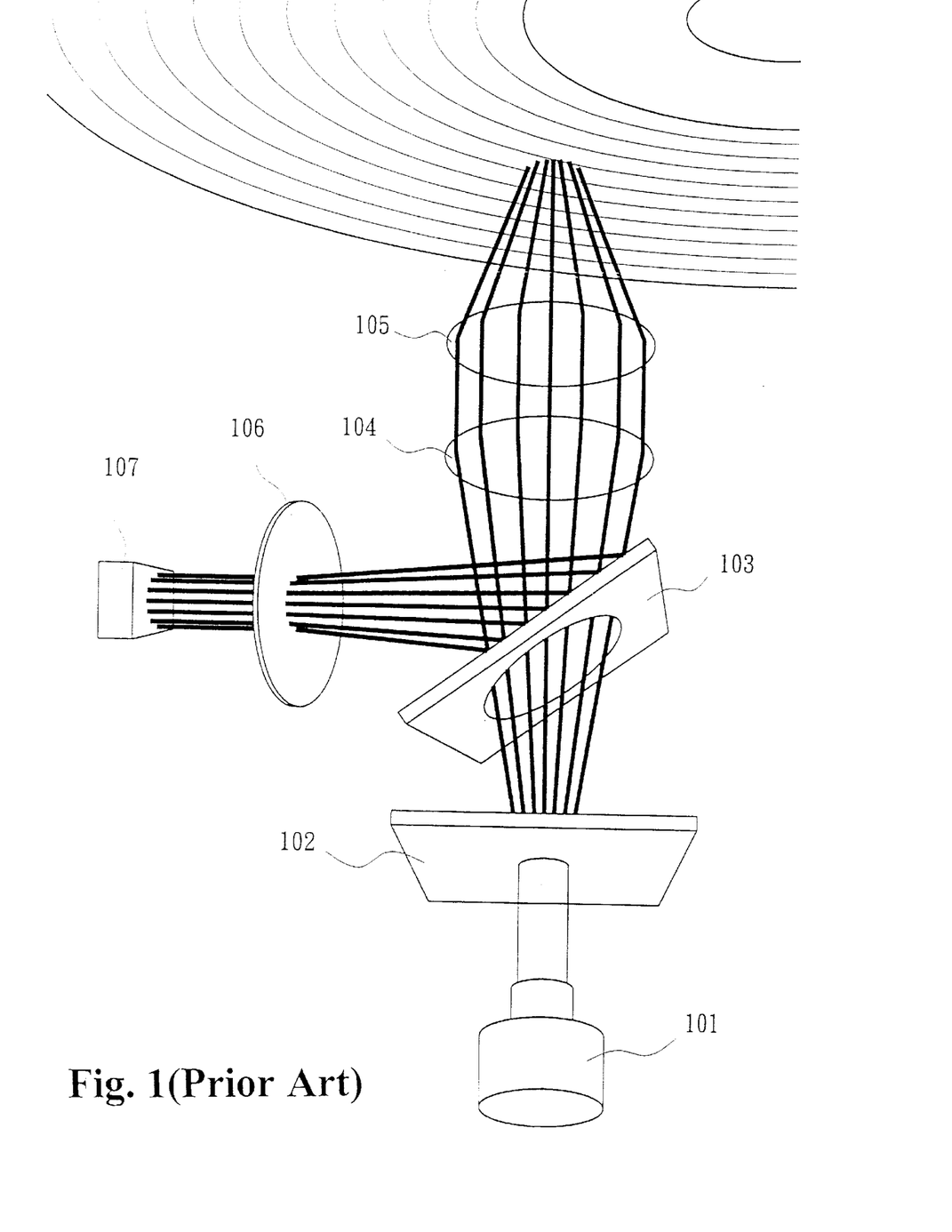
FIG. 1 is a schematic view of the optical path of a multiple-beam optical pick-up head.

FIG. 1 shows the optical path of an optical pick-up head with multiple beams.

A light source 101 generates an incident light, which is split by a grating 102 into a plurality of beams. After passing through a beam splitter 103, a collimator lens 104, and an objective lens 105, the beams reach the optical disk surface and am reflected. The reflected beams then pass through the objective lens 105, the collimator lens 104 and are deflected by the beam splitter 103. Finally, after passing through another grating 106, the reflected beams are absorbed by a photodetector 107.

A conventional optical pick-up head comprises a beam splitter, a laser diode, a cylindrical lens, a photodetector, and etc. Since the elements are conventional separate ones, the package volume and weight of the elements are larger.

A holographic optical pick-up head replace the optical devices such as beam splitter and the cylindrical lens of a pick-up head in the prior art with a piece of tiny hologram. It shortens the distance between the laser diode and the photodetector. Therefore, all devices can be encapsulated within a tiny package called the holographic laser module.

Figure 2:
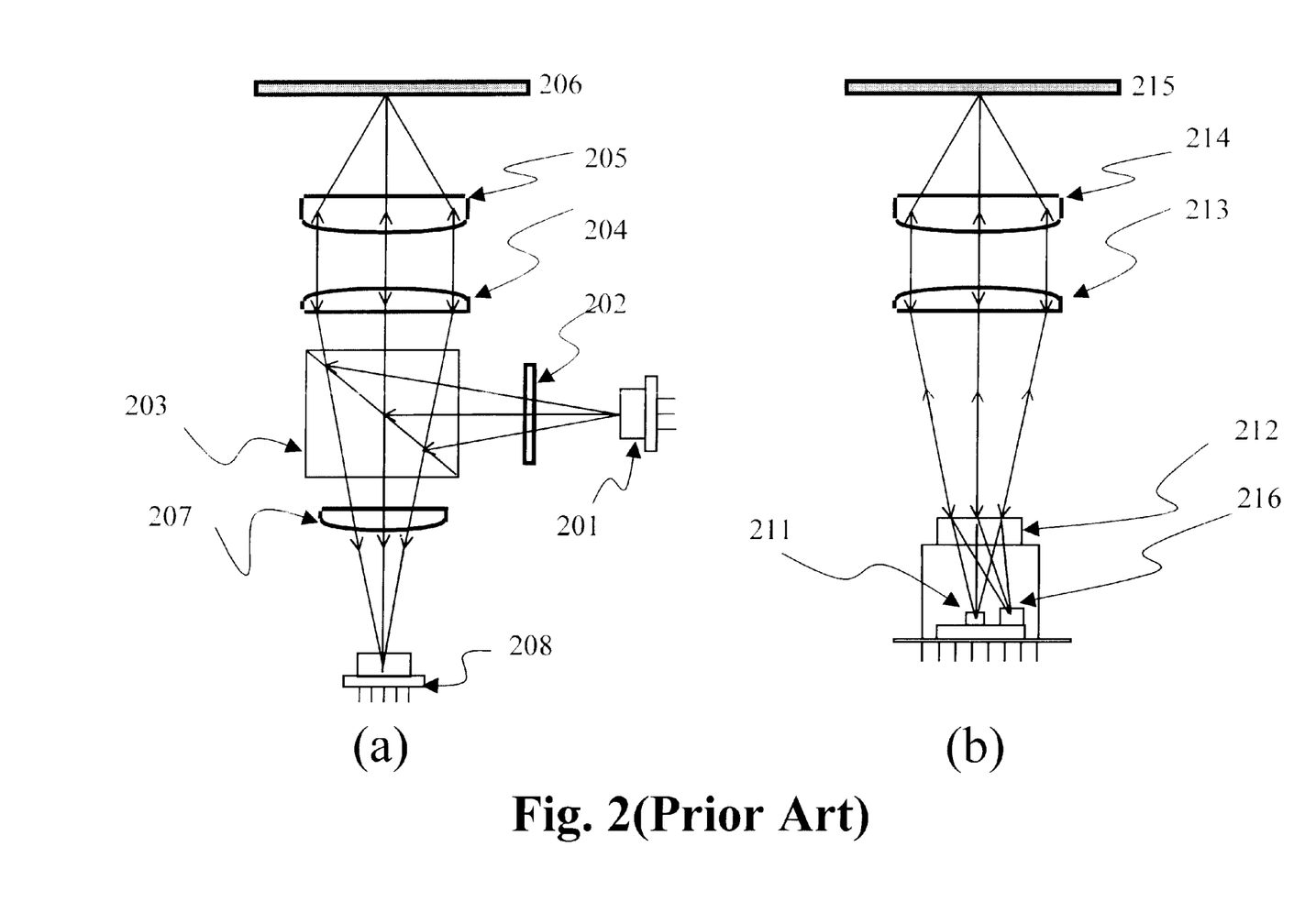
FIG. 2 compares a normal optical pick-up head with a holographic optical pick-up head.

FIGS. 2(a) and 2(b) show a conventional optical pick-up head and a holographic optical pick-up head, respectively.

The components described in FIGS. 2(a) and 2(b) are all well known in the art. They include: light source (201, 211), grating (207, 212), prism (203), collimator lens (204, 213), objective lens (205, 214), reflector (206, 215), another grating (202), and photodetector (208, 216).

Currently, holographic laser modules are very popular in single beam pick-up heads. But there is no multiple-beam optical pick-up head using the holographic laser module. The main reason is that the laser beam usage efficiency of the holographic optical pick-up head is low. For a single beam pick-up head, the energy efficiency of one that uses a holographic laser module is only $1/12$ of that of a conventional one. The multiple-beam pick-up head further splits one laser beam into a plurality of separate beams and thus diverse the laser beam energy. If one further combines both, the energy efficiency is even lower. Since the energy that reaches the photodetector decreases in such systems, the associated photoelectric current after photoelectric conversion is so weak that the S/N ratio is small. Then the gain of the I-to-V preamplifier has to be raised to meet the need. However, the frequency band of an amplifier is inversely proportional to the gain. Therefore, increasing the gain of the preamplifier will decrease the allowed frequency band of the pick-up head and thus limit the data access speed.

To sum up, the multiple-beam optical pick-up head has the advantage of greatly increasing the access speed of the optical disk drive, the holographic optical pick-up head has the merits of a small volume, easy to design and produce. If one wants to combine both, i.e., to have a holographic pick-up head with multiple beams, how to increase the laser energy efficiency is an important technical issue to be solved.

SUMMARY OF THE INVENTION

It is a principal object of the present invention to provide a multiple-beam holographic optical pick-up head that can increase the laser beam usage efficiency.

The disclosed technology uses a polarized diffractive optical element to diffract laser light polarized in a specific direction while leaving the laser light polarized in the other direction unaffected at all. Two polarized diffractive optical elements are provided on the optical path of the system. One is a multiple-beam grating which can diffract one incident beam into several beams, but let reflective beams to completely pass through. The other is a hologram which allows the incident light to completely pass through without diffraction and diffracts the reflective beams. A quarterwave plate is provided on the optical path of the pick-up head for changing the polarization directions of the incident light and reflected light. Since both the incident beams and reflected beams experience diffraction once only, there would not be such problems as low efficiency. The multiple-beam holographic optical pick-up head is formed by combining both the multiple-beam optical pick-up head and the holographic optical pick-up head, and thus has the advantages of both systems.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 3:
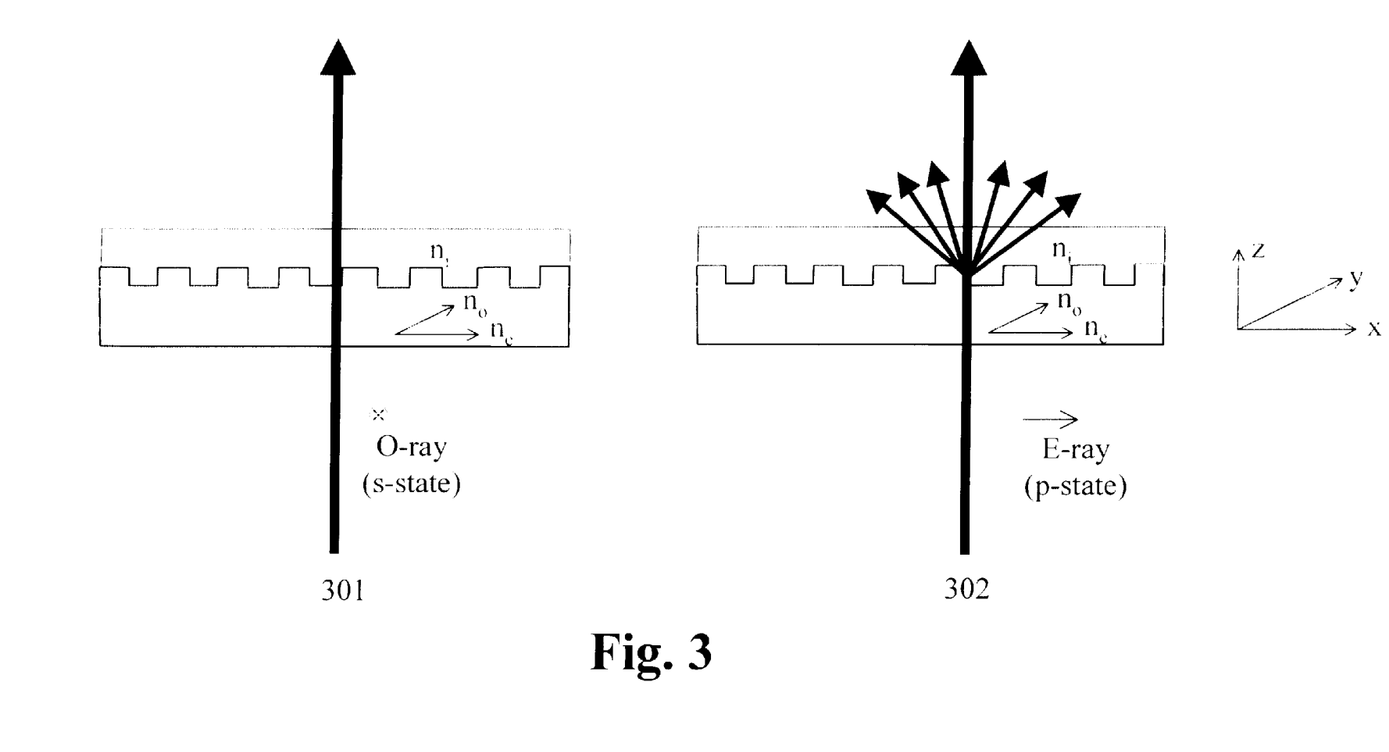
FIG. 3 illustrates how a polarized diffractive optical element functions.

Please refer to FIG. 3 for an illustration of how a polarized diffractive optical element functions.

A polarized diffractive optical element uses the birefringent property of the material to diffract laser light polarized in a specific direction, leaving laser light polarized in the other direction unaffected and completely passing through.

The diffractive optical element is manufactured by filling a material with one refraction index over a surface-etched birefringent material substrate. Assume that the material with one refraction index has an index of $n_i$ and the refraction indices of the birefringent material on an ordinary ray (hereinafter as O-ray) polarized incident light and an extraordinary ray (hereinafter as E-ray) polarized incident light are $n_o$ and $n_e$, respectively.

The birefringent material and the single index material are selected so that $n_o$ is very close to $n_i$. When the incident light is an O-ray 301, it will completely pass through this diffractive optical element without diffraction because of the index matching between $n_o$ and $n_i$. When the incident light is an E-ray 302, there will be diffraction due to the difference between $n_e$ and $n_i$.

This type of polarized diffractive optical elements can be formed by filling a birefringent material over a surface-etched single index material.

Figure 4A:
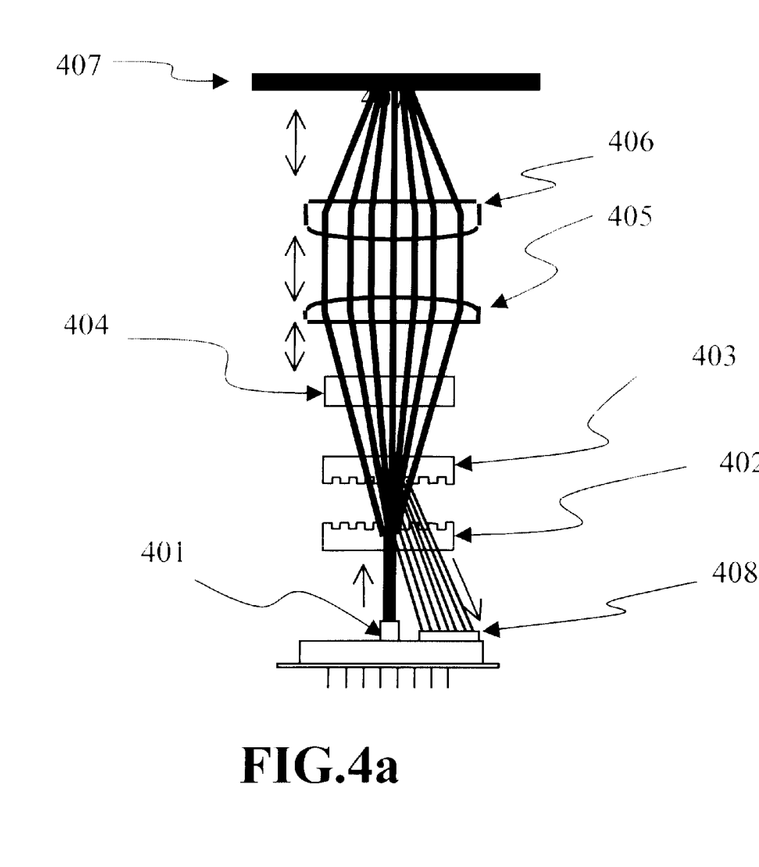
FIG. 4 is a first embodiment of the multiple-beam holographic optical pick-up head according to the present invention.

FIG. 4(*a*) is a first embodiment of the multiple-beam holographic optical pick-up head according to the present invention. The pick-up head comprises:

a light source generator 401 for generating a linearly polarized beam as the incident light;

a multiple-beam grating 402 installed in front of the light source generator 401 for diffracting the incident beam into a plurality of beams and allowing reflected beams to completely pass through, which grating 402 is formed by filling an etched substrate with a filling material, wherein the substrate and filling material can be a single index material and a birefringent material, respectively, or vice versa, with the refraction index of the single index material $n_i$ being close to one of the two refraction indices $n_o$ and $n_e$ of an the birefringent material(e.g., $|n_i-n_o|/n_i<10\%$ or $|n_i-n_e|/n_i<10\%$);

a quarterwave retardation plate 404 installed in front of an optical recording medium 407 for making the polarization direction of the incident beam perpendicular to that of the reflected beam by having the phase of the incident light retarded by 90° after passing through the quarterwave retardation plate, the linearly polarized light being converted into a circularly polarized light, and having the phase of the reflected light retarded by 90° after passing through the quarterwave retardation plate, the circularly polarized light being converted back into a linearly polarized light but with a phase difference of 180° from that of the incident light (i.e., the polarization directions are perpendicular);

a hologram 403 as a polarized diffractive optical element installed between the multiple-beam grating 402 and the quarterwave retardation plate 404 for allowing the incident light to completely pass through while making the reflected light diffracted to produce deflected light, the hologram being comprised of a substrate and a filling material for filling the substrate once it is etched, wherein the substrate and filling material can be a single index material and a birefringent material, respectively, or vice versa, with the refraction index of the single index material $m_i$ being close to one of the two refraction indices $m_o$ and $m_e$ of the birefringent material (e.g., $|m_i-m_o|/m_i<10\%$ or $|m_i-m_e|/m_i<10\%$); and a photodetector 408 installed on the optical path of the deflected light generated by the hologram 403 for receiving the reflected light and converting it into the corresponding electrical signals.

The light source generator 401 generates a linearly polarized light as the incident light. When the incident light enters the multiple-beam grating 402, it will be diffracted into a plurality of beams due to the different refraction indices of the substrate and the filling material upon the incident light. When the incident light enters the hologram 403, it will not be diffracted and completely pass through because the refraction indices of the substrate and the filling material are close. When the incident light enters the quarterwave retardation plate 404, its phase will be retarded by 90° and the linearly polarized light becomes a circularly polarized light. The incident light passes through a parallel lens 405, an objective lens 406 and projects onto the optical recording medium 407. When the reflected light from the optical recording medium 407 enters the quarterwave retardation plate 404, its phase is further retarded by 90° and the circularly polarized light turns back into a linearly polarized light, but with a phase difference of 180° from the original incident light (i.e., their polarization directions are perpendicular to each other). When the reflected light enters the hologram 403, it is diffracted to generate deflected light due to the different refraction indices of the substrate and the filling material upon the reflected light. When the reflected light enters the multiple-beam grating 402, it completely passes through without diffraction because the refraction indices of the substrate and the filling material are close for the reflected light. Once the reflected light is received by the photodetector 408, it is converted into the corresponding electrical signals for obtaining the data on the optical recording medium. Since both the incident and reflected beams are diffracted just once, the problem of low efficiency in laser light uses can be conquered.

Figure 4B:
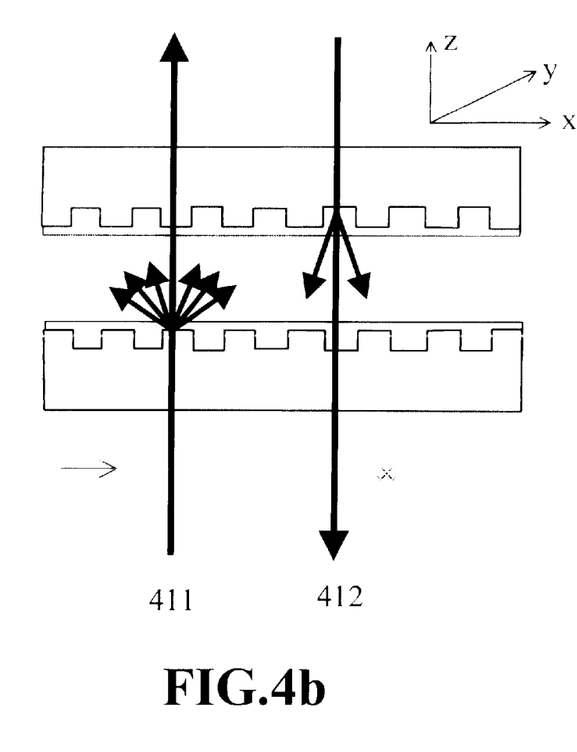

The incident and reflected beams are shown as 411 and 412, respectively, in FIG. 4(*b*).

Figure 5A:
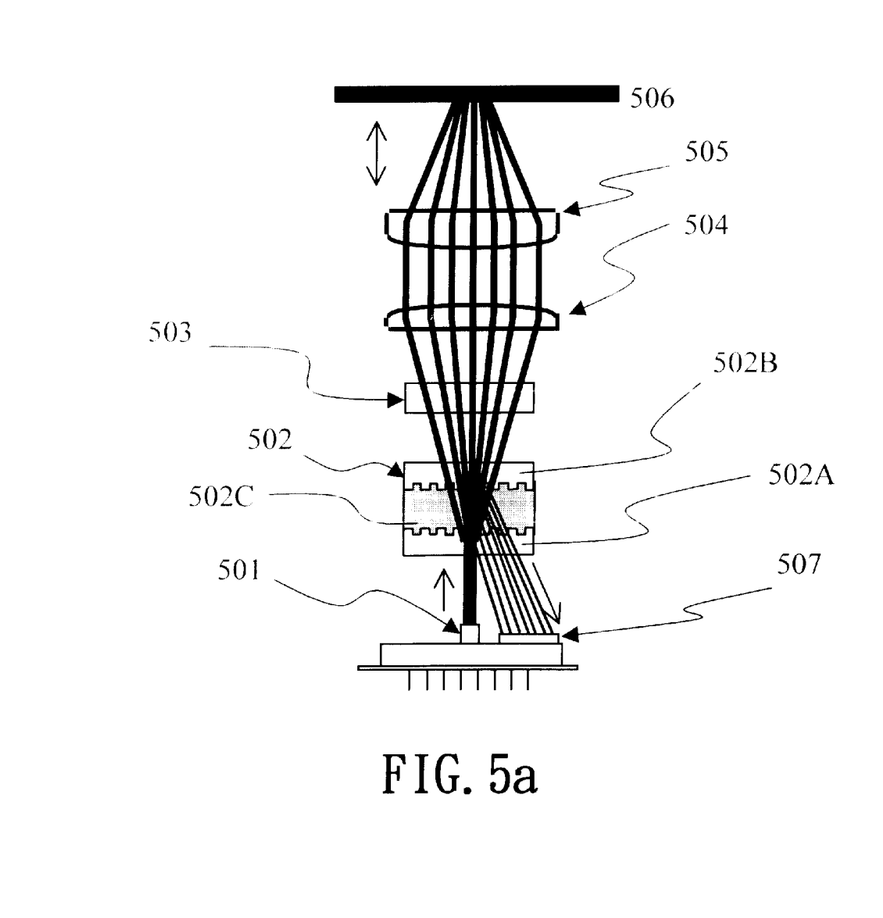
FIG. 5 shows a second embodiment of the multiple-beam holographic optical pick-up head according to the present invention.

FIG. 5(*a*) shows a second embodiment of the multiple-beam holographic optical pick-up head according to the present invention. It comprise:

a light source generator 501 for generating a linearly polarized beam as the incident light;

a multiple-beam hologram 502 as a polarized diffractive optical element installed in front of the light source generator 501, which hologram 502 is composed of a first layer of substrate 502A disposed closer to the light source generator 501, a second layer of substrate 502B disposed closer to an optical recording medium 506 and a filling material 502C filling in between, the first layer of substrate being a birefringent material with indices $n_{o1}$ and $n_{e1}$, the filling material being a single index material with the index $n_i$, and the second layer of substrate being a birefringent material with indices $n_{o2}$ and $n_{e2}$, wherein when $n_i$ is close to both $n_{e2}$ and $n_{o1}$ the incident light is diffracted by the first layer or substrate 502A into a plurality of beams and the beams completely pass through the second layer of substrate 502B and the filling material 502C, whereas the reflected light is diffracted by the second layer of substrate 502B into deflected light, which completely passes through the first layer of material 502A and the filling material 502C;

a quarterwave retardation plate 503 installed in front of the optical recording medium 506 for making the polarization directions of the incident and reflected beams perpendicular to each other; and a photodetector 507 installed on the optical path of the deflected light generated by the multiple-beam hologram 502 for receiving the reflected light and converting it into the corresponding electrical signals.

Figure 5B:
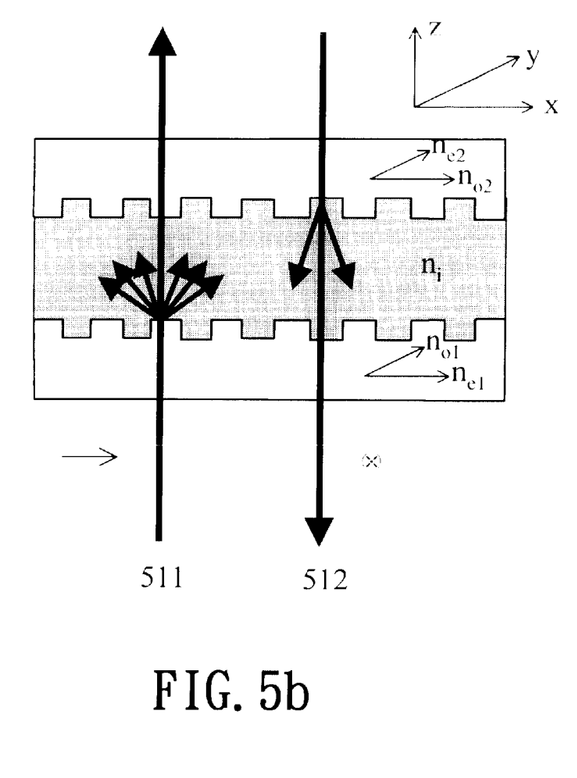

FIG. 5(a) also shows a parallel lens 504 and an objective lens 505, similar to the parallel lens 405 and objective lens 406, respectively, shown in FIG. 4(a). The incident and reflected beams are shown as 511 and 512, respectively, in FIG. 5(b).

The main difference between the current embodiment and the first embodiment is in that the multiple-beam grating and the hologram has been combined to form a multiple-beam hologram.

Figure 6A:
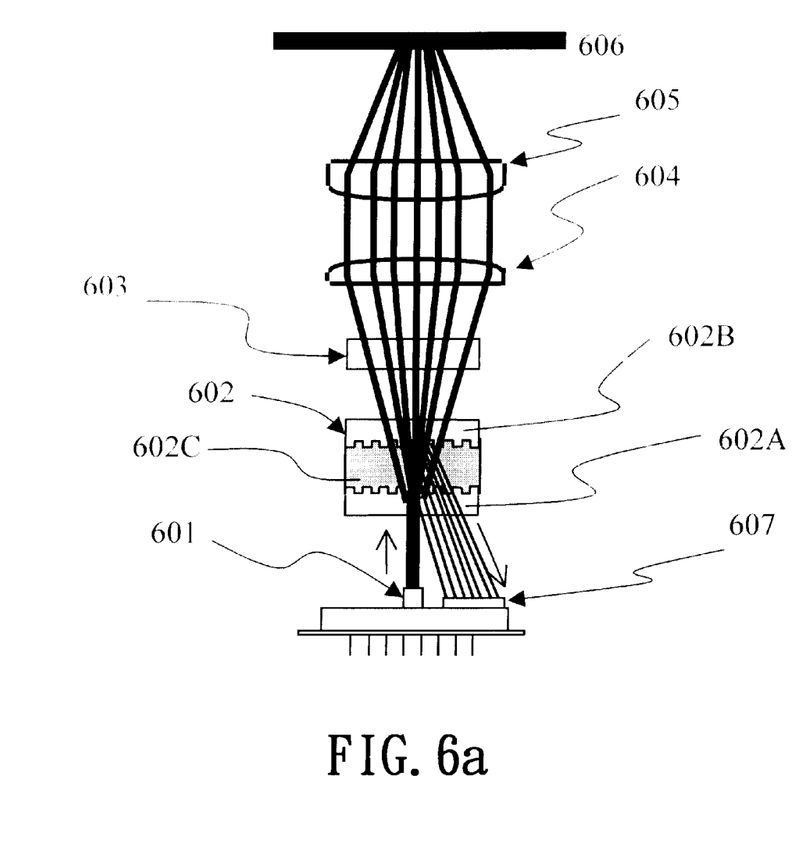
FIG. 6 shows a third embodiment of the multiple-beam holographic optical pick-up head according to the present invention.

FIG. 6(a) shows a third embodiment of the multiple-beam holographic optical pick-up head according to the present invention. It comprises:

a light source generator 601 for generating a linearly polarized beam as the incident light;

a multiple-beam hologram 602 as a polarized diffractive optical element installed in front of the light source generator 601, which hologram 602 is composed of a first layer of substrate 602A disposed closer to the light source generator 601, a second layer of substrate 602B disposed closer to an optical recording medium 606 and a filling material filling 602C in between, the first layer of substrate being a single index material with the index $n_1$, the filling material being a birefringent material with the indices $n_o$ and $n_e$, and the second layer of substrate being a single index material with the index $n_2$, wherein when $n_2$ is close to $n_e$ and $n_1$ is close to $n_o$ the incident light is diffracted by the first layer or substrate 602A into a plurality of beams and the beams completely pass through the second layer of substrate 602B and the filling material 602C, whereas the reflected light is diffracted by the second layer of substrate 602B into deflected light, which completely passes through the first layer of material 602A and the filling material 602C;

a quarterwave retardation plate 603 installed in front of the optical recording medium 606 for making the polarization directions of the incident and reflected beams perpendicular to each other; and a photodetector 607 installed on the optical path of the deflected light generated by the multiple-beam hologram 602 for receiving the reflected light and converting it into the corresponding electrical signals.

Figure 6B:
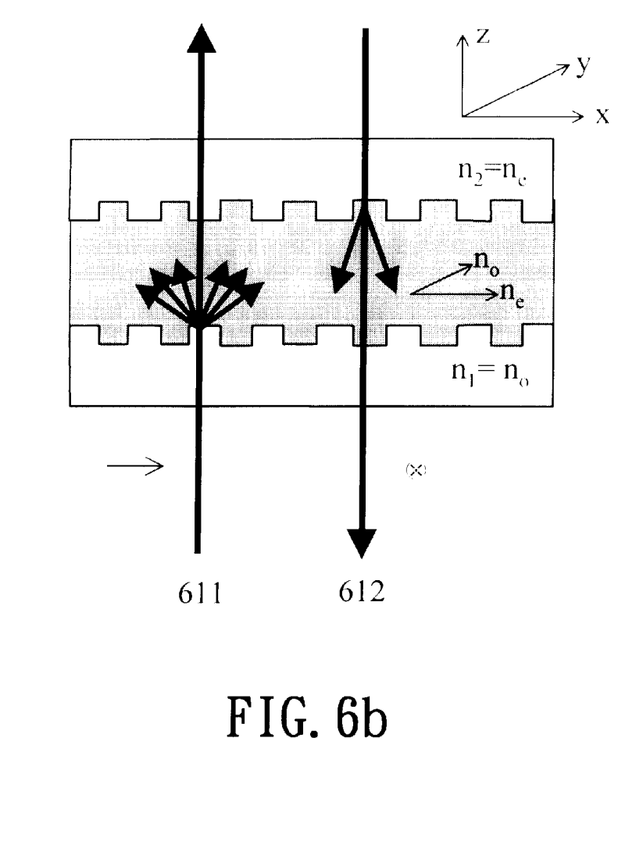

FIG. 6(a) also shows a parallel lens 604 and an objective lens 605, similar to the parallel lens 405 and objective lens 406, respectively, shown in FIG. 4(a). The incident and reflected beams are shown as 611 and 612, respectively, in FIG. 6(b).

The main difference between the current embodiment and the second embodiment is in that the second embodiment uses birefringent materials as the first and second layers of substrate and a single index material as the filling material in the multiple-beam hologram, while the current embodiment uses a single index material as the first and second layers of substrate and a birefringent material as the filling material in the multiple-beam hologram.

Figure 7A:
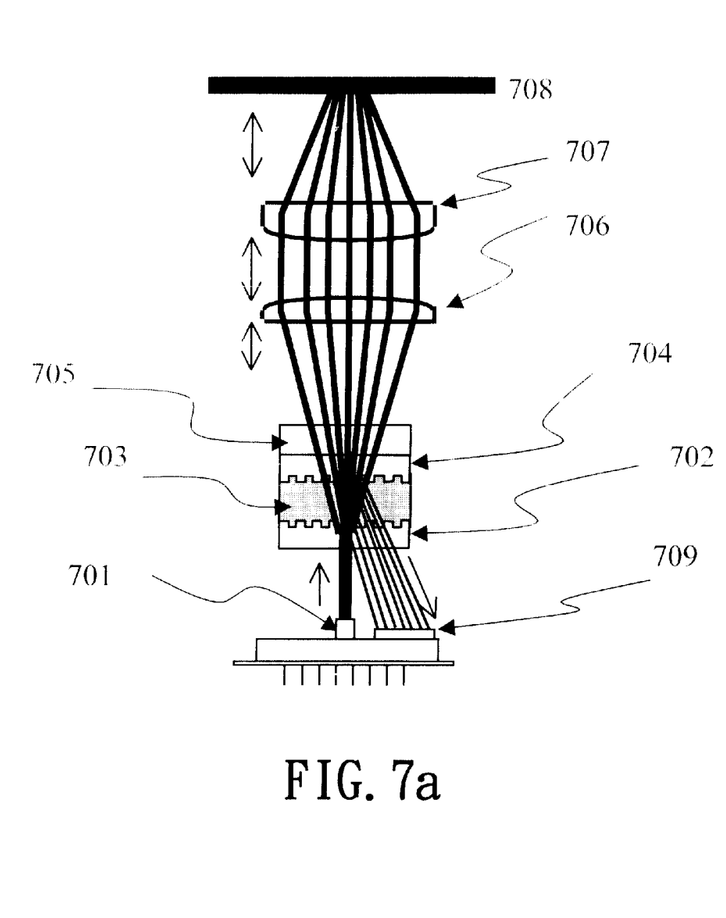
FIG. 7 shows a fourth embodiment of the multiple-beam holographic optical pick-up head according to the present invention.
Figure 7B:
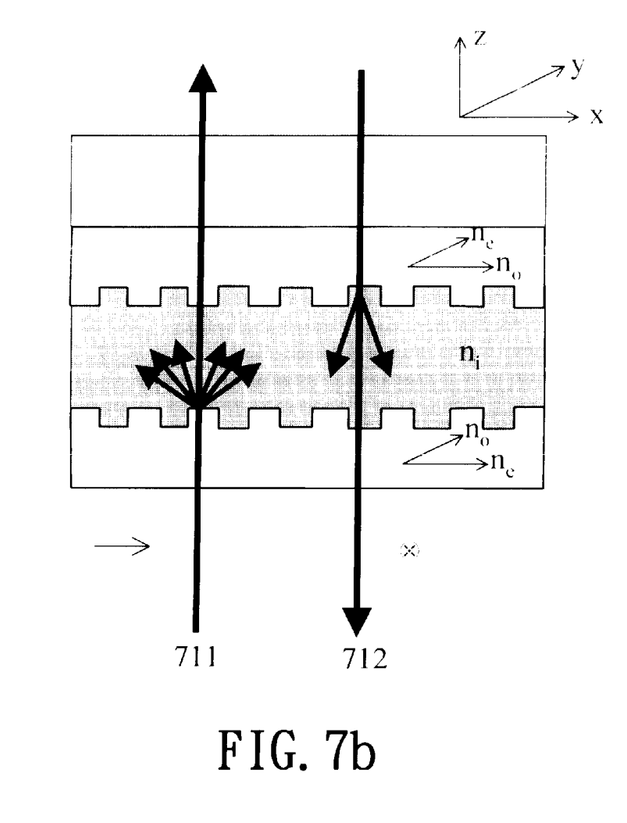

FIG. 7(a) shows a fourth embodiment of the multiple-beam holographic optical pick-up head according to the present invention. Similar to the previous three embodiments, it also contains a light source generator 701, a first layer of substrate 702, a second layer of substrate 704, a filler material between the two layers of substrate 703, a quarterwave retardation plate 705, a parallel lens 706 and an objective lens 707. The main difference between tho fourth embodiment and previous embodiments is that the multiple-beam hologram (which comprises the first layer of substrate 702, the second layer of substrate 704, and the filler material 703) is very closely connected to the quarterwave retardation plate 705 in the fourth embodiment. The connection can be done by glue or by directly etching a diffraction pattern on the quarterwave retardation plate. Similar to other embodiments, the incident and reflected beams are shown as 711 and 712, respectively, in FIG. 7(b).

EFFECTS OF THE INVENTION

The present invention discloses a multiple-beam holographic optical pick-up head, which combines the technologies of the multiple-beam optical pick-up head and the holographic optical pick-up head. It can be applied in data reading/writing on optical recording media. It has such advantages as increasing data access speed, small volume, simple design and ideal for mass production.

While the present invention has been shown and described with reference to the foregoing preferred embodiments, it is to be understood by those skilled in the art that other changes in form and detail may be made therein without departing from the spirit and scope of the invention as defined in the appended claims.

What is claimed is:

1. A multiple-beam holographic optical pick-up head for generating an incident light projecting onto an optical recording medium and receiving the reflected light therefrom so as to access data stored thereon, which pick-up head comprises:

a light source generator for generating a linearly polarized light as the incident light;

a multiple-beam grating, which is a polarized diffractive optical element for diffracting the incident light into a plurality of beams and allowing the reflected light to completely pass through;

a quarterwave retardation plate installed in front of the optical recording medium for changing the polarization directions of the incident and reflected light;

a hologram, which is a polarized diffractive optical element installed between the multiple-beam grating and the quarterwave retardation plate for generating deflected light from the reflected light by diffraction and allowing the incident light to completely pass through; and a photodetector installed on the optical path of the deflected light generated by the hologram for receiving the reflected light and converting it into the corresponding electrical signals.

2. The optical pick-up head of claim 1, wherein the multiple-beam grating is composed of single index and birefringent materials arranged interposedly on the same plane and the refraction index of the single index material is close to one of the two refraction indices of the birefringent material.

3. The optical pick-up head of claim 2, wherein the difference between the refraction index of the single index material and the one of the two refraction indices of the birefringent material is smaller than 10% of the refraction index of the single index material.

4. The optical pick-up head of claim 3, wherein the substrate is a single index material and the filling material is a birefringent material.

5. The optical pick-up head of claim 4, wherein the multiple-beam grating is made by etching a pattern on a single index material and filling a birefringent material thereon.

6. The optical pick-up head of claim 3, wherein the substrate is a birefringent material and the filling material is a single index material.

7. The optical pick-up head of claim 6, wherein the multiple-beam grating is made by etching a pattern on a birefringent material and filling a single index material thereon.

8. The optical pick-up head of claim 1, wherein the hologram is composed of single index and birefringent materials arranged interposedly on the same plane and the refraction index of the single index material is close to one of the two refraction indices of the birefringent material.

9. The optical pick-up head of claim 8, wherein the difference between the refraction index of the single index material and the one of the two refraction indices of the birefringent material is smaller than 10% of the refraction index of the single index material.

10. The optical pick-up head of claim 9, wherein the substrate is a single index material and the filling material is a birefringent material.

11. The optical pick-up head of claim 10, wherein the hologram is made by etching a pattern on a single index material and filling a birefringent material thereon.

12. The optical pick-up head of claim 9, wherein the substrate is a birefringent material and the filling material is a single index material.

13. The optical pick-up head of claim 12, wherein the hologram is made by etching a pattern on a birefringent material and filling a single index material thereon.

14. A multiple-beam holographic optical pick-up head for generating an incident light projecting onto an optical recording medium and receiving the reflected light therefrom so as to access data stored thereon, which pick-up head comprises:

a light source generator for generating a linearly polarized light as the incident light;

a multiple-beam hologram installed in front of the light source generator, the hologram being composed of a first layer of substrate closer to the light source generator, a second layer of substrate closer to the optical recording medium and a filling material in between, allowing the incident light to be diffracted into a plurality of beams by the first layer of substrate but to completely pass through the second layer of substrate and the filling material, and allowing the reflected light to be diffracted into deflected light by the second layer of substrate but to completely pass through the first layer of substrate and the filling material;

a quarterwave retardation plate installed in front of the optical recording medium for changing the polarization directions of the incident and reflected light;

a photodetector installed on the optical path of the deflected light generated by the hologram for receiving the reflected light and converting it into the corresponding electrical signals.

15. The optical pick-up head of claim 14, wherein the first layer of substrate and the second layer of substrate are single index materials and the filling material is a birefringent material.

16. The optical pick-up head of claim 15, wherein one of the two refraction indices of the filling material is close to the refraction index of the first layer of substrate and the other refraction index of the filling material is close to refraction index of the second layer of substrate.

17. The optical pick-up head of claim 16, wherein the difference between one of the two refraction indices of the filling material and the refraction index of the first layer of substrate is smaller than 10% and the difference between the other refraction index of the filling material and the refraction index of the second layer of substrate is smaller than 10%.

18. The optical pick-up head of claim 17, wherein the first layer of substrate and the second layer of substrate are birefringent materials and the filling material is a single index material.

19. The optical pick-up head of claim 18, wherein the refraction index of the filling material is close to one of the two refraction indices of the first layer of substrate and one of the two refraction indices of the second layer of substrate.

20. The optical pick-up head of claim 19, wherein the difference between the refraction index of the filling material and one of the two refraction indices of the first layer of substrate is smaller than 10% and the difference between the refraction index of the filling material and one of the two refraction indices of the second layer of substrate is smaller than 10% .

* * * * *